Sept. 21, 1954     H. BENTJENS     2,689,394
ROTARY CUTTER

Filed May 20, 1952

INVENTOR.
HEINZ BENTJENS.
BY
K. B. Mayr
ATTORNEY.

Patented Sept. 21, 1954

2,689,394

UNITED STATES PATENT OFFICE 2,689,394

ROTARY CUTTER

Heinz Bentjens, Hamburg-Altona, Germany, assignor to Wilhelm Fette Prazisionswerkzeug-Fabrik, Schwarzenbek Kreis Lauenburg, Germany Application May 20, 1952, Serial No. 288,944

Claims priority, application Germany
June 30, 1951

4 Claims. (Cl. 29—105)

The present invention relates to improvements in rotary cutting tools, and more particularly to cutters, having inserted teeth or cutter blades. In such cutters the cutting edges must receive their necessary clearance angle either by backing off or relief grinding or they are ground circular in an auxiliary member at an inclination corresponding to the clearance angle so that the teeth, when fitted in the holder, provide the necessary clearance.

In both cases the production of such tools is extremely difficult since not only great precision is required for finishing the cutter profile and the holders, but the teeth must be fitted in the cutter body with high precision and practically without any tolerance if a milling type cutter with inserted blades is to operate satisfactorily. Furthermore in the production of the holders the precise maintenance of a satisfactory pitch without the use of spindles in grooves of plies equally to cutters in which the cutting blades or teeth have rectangular or trapezoidal carriers fitting in corresponding grooves of the cutter body as also to cutters in which the blades are supported on pins or in sockets and rest on the cutter body.

The said difficulties are considerably simplified by the construction according to the invention in which the cutter blade has a profile which permits rotation in the body without the use of spindles, in recesses of the body corresponding in shape to that of the said profile. The cutter blades according to the invention have a cylindrical profile and are supported without the use of the spindles in grooves of the tool holder which grooves are of arcuate cross section. In the present state of the art there is little difficulty in producing such cylindrical workpieces of highest precision as well as grooves of arcuate cross section accurately distributed in the periphery of the tool holder; these grooves can be milled or ground in successive steps or produced in generating processes by hobbing or by grinding.

The present invention permits the cutters to be rotated in the cutter body in such a way that their profile can be ground circular without requiring a separate relieving operation and they can thereafter be so rotated that the desired clearance angle is obtained.

Moreover, the cross section of the cutter blades and that of the receiving grooves need not necessarily be cylindrical, it can also be of prismatic shape, for example of polygonal form or as a multi-toothed profile, without departing from the scope of the invention; a further feature of the invention consists in that the two ends of the blades, rotatable without the use of spindles in the recesses of the cutter body, are provided with several, i. e. at least two, stepped arcuate shoulders, one of said shoulders being coaxial of the outer cutter surface and the other of said shoulders forming an angle with the first shoulder, on which shoulders end caps are adapted to be placed which secure the blades against rotation.

One constructional example is shown on the drawing in end and side views and partly in section.

Figure 1:
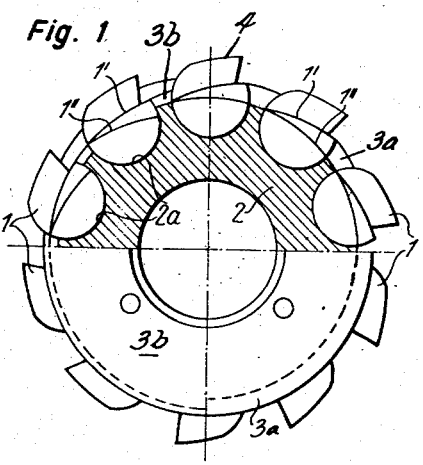
Figure 1 is an end view of the cutter partly in section.
Figure 2:
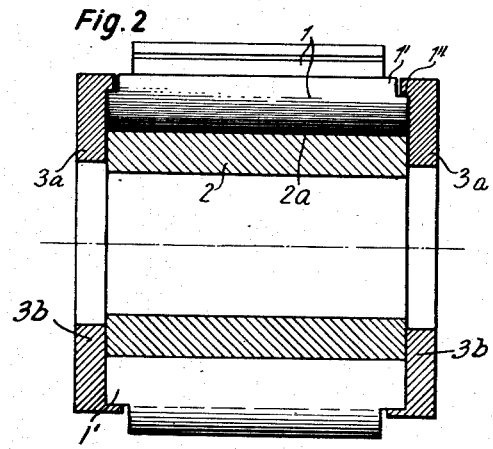
Figure 2 is a side view along the length of the cutter partly in section.

In Fig. 1 the cutter blade 1 illustrated on the left hand side is shown in the circular grinding position and the right hand blades are shown in operating position. The cutters have a part cylindrical cross section and rest in arcuate grooves 2a of corresponding cross section in the tool holder 2. The ends of the blades 1 (see also Fig. 2) are provided with arcuate shoulders 1' 1'' which are engaged by interior shoulders of interchangeable end caps 3a or 3b, respectively. The cap 3b as indicated on the left side of Fig. 1 and on the lower part of Fig. 2 engages the shoulders 1' and serves to retain the blades in the circular grinding position while the caps 3a on the right side of Fig. 1 and on the upper half of Fig. 2 engage the shoulders 1'' of the blades and serve to retain the blades in the operating position in which the blades are turned so as to position the cutting edges more distantly from the axis of rotation of the cutter and to provide a clearance surface in the rear of said cutting edge. Each cutter has an outer surface 4 of part cylindrical configuration rearwardly extending from the cutting edge. The surfaces 4 are coaxial of the cutting tool when the cutters are in position to be ground.

What I claim is:

1. A rotary cutting tool comprising a substantially cylindrical tool holder, a plurality of substantially axial grooves in the periphery of said holder, said grooves having a substantially part-circular cross sectional configuration, a cutter having a substantially part-cylindrical portion inserted in each of said grooves and being rotatable therein, a part of said substantially part-cylindrical portion axially projecting from at least one end of the cutter, said projecting part having a shoulder forming a part-cylindrical surface which is coaxial of said tool holder at a certain angular position of the cutter, and a cap member having an interior cylindrical shoulder coaxial of said tool holder and abutting against said shoulder of said projecting part for preventing rotation of the cutter in its groove beyond an angle defined by the diameter of said interior shoulder.

2. A rotary cutting tool as set forth in claim 1, said cutter having a cutting edge and an outer surface of part-cylindrical configuration rearwardly extending from said cutting edge, said outer surface being substantially coaxial of the cutting tool when the cutter is in position to be ground.

3. A rotary cutting tool comprising a substantially cylindrical tool holder, a plurality of substantially axial grooves in the periphery of said holder, said grooves having a substantially part-circular cross sectional configuration, a cutter having a substantially part-cylindrical portion inserted in each of said grooves and being rotatable therein, a part of said substantially part-cylindrical portion axially projecting from at least one end of the cutter, said projecting part having a shoulder forming a part-cylindrical surface which is coaxial of said tool holder at a certain angular position of the cutter, and a cap member having an interior cylindrical shoulder coaxial of said tool holder and having substantially the same diameter as and being adjacent to said shoulder of said projecting part for holding said cutter in a predetermined angular position.

4. A rotary cutting tool comprising a substantially cylindrical tool holder, a plurality of substantially axial grooves in the periphery of said holder, said grooves having a substantially part-circular cross sectional configuration, a cutter having a substantially part-cylindrical portion inserted in each of said grooves and being rotatable therein, a first part of said substantially part-cylindrical portion axially projecting from at least one end of the cutter, said first projecting part having a shoulder forming a part-cylindrical surface which is coaxial of said tool holder at a certain angular position of the cutter, a first cap member having an interior cylindrical shoulder coaxial of said tool holder and having substantially the same diameter as and being adjacent to said shoulder of said projecting part for holding said cutter in a predetermined angular position, a second part of said cylindrical portion axially projecting from said first part and having a shoulder forming a part-cylindrical surface of smaller diameter than the shoulder of said first projecting part, the part-cylindrical surface forming the shoulder of said first projecting part and the part-cylindrical surface forming the shoulder of said second projecting part having a common cylinder generatrix, and a second cap member interchangeable with said first cap member and having an interior cylindrical shoulder coaxial of said tool holder and having substantially the same diameter and being adjacent to the shoulder of said second projecting part for holding said cutter in a different predetermined angular position.

References Cited in the file of this patent

UNITED STATES PATENTS

| Number | Name | Date |
|---|---|---|
| 1,109,321 | Charles | Sept. 1, 1914 |
| 1,241,953 | Frick | Oct. 2, 1917 |
| 1,243,502 | Frick | Oct. 16, 1917 |
| 1,393,818 | Olson | Oct. 18, 1921 |
| 2,153,124 | Schurr | Apr. 4, 1939 |

FOREIGN PATENTS

| Number | Country | Date |
|---|---|---|
| 482,160 | Germany | Sept. 10, 1929 |